(12) United States Patent
Mitsutomi et al.

(10) Patent No.: US 8,512,186 B2
(45) Date of Patent: Aug. 20, 2013

(54) TOOTHED POWER TRANSMISSION BELT

(75) Inventors: Manabu Mitsutomi, Kobe (JP); Takayuki Utsumi, Himeji (JP); Masakuni Yoshida, Kobe (JP)

(73) Assignee: Mitsuboshi Belting Ltd. (JP)

( * ) Notice: Subject to any disclaimer, the term of this patent is extended or adjusted under 35 U.S.C. 154(b) by 230 days.

(21) Appl. No.: 12/941,202

(22) Filed: Nov. 8, 2010

(65) Prior Publication Data
US 2011/0118068 A1 May 19, 2011

(30) Foreign Application Priority Data

Nov. 13, 2009 (JP) ................................. 2009-259671
Aug. 20, 2010 (JP) ................................. 2010-184848

(51) Int. Cl.
*F16G 1/10* (2006.01)
*F16G 1/12* (2006.01)

(52) U.S. Cl.
USPC ........................................................ 474/205

(58) Field of Classification Search
USPC ............................................................ 474/205
See application file for complete search history.

(56) References Cited

U.S. PATENT DOCUMENTS

2007/0178792 A1* 8/2007 Yoshida et al. ............... 442/293
2008/0318719 A1* 12/2008 Izu et al. ........................ 474/205

FOREIGN PATENT DOCUMENTS

| JP | A-2000-27949 | | 1/2000 |
| JP | 2006153249 A | * | 6/2006 |
| JP | A-2008-101728 | | 5/2008 |
| JP | 2008291205 A | * | 12/2008 |

* cited by examiner

*Primary Examiner* — William E Dondero
*Assistant Examiner* — Diem Tran
(74) *Attorney, Agent, or Firm* — Wood, Phillips, Katz, Clark & Mortimer

(57) ABSTRACT

A power transmission belt having a body with a length, an inside and an outside. Teeth are spaced along the length of the body. The body is made of rubber in which at least one load carrying member is embedded. The load carrying member extends lengthwise of the body. The rubber in the body is made up of: a) 3 to 7 parts by mass of short fiber blended relative to 100 parts by mass of a polymer that is a hydrogenated nitrile rubber having unsaturated carboxylic acid metal salt formed by mixing the hydrogenated nitrile rubber and the unsaturated carboxylic acid metal salt at a mass ratio of from 100:100 to 100:180; and b) no more than 10 parts by mass of a powdery inorganic filler blended relative to 100 parts by mass of the polymer.

23 Claims, 2 Drawing Sheets

TOOTHED POWER TRANSMISSION BELT

BACKGROUND OF THE INVENTION

1. Field of the Invention

This invention relates to power transmission belts and, more particularly, to power transmission belts having teeth at spaced intervals along the length thereof.

2. Background Art

Toothed belts are used in a number of different industries. In one application, toothed belts are used for the synchronous driving of machine components wherein there is a potentially high load transmission capability required.

Toothed belts often fail primarily for two different reasons. First of all, load carrying/tension members may break due to bending fatigue. Second, rubber that is used to construct the belts may not have adequate resistance to heat encountered in a particular use environment.

To improve the performance of the load carrying/tension members, efforts have been made to improve the quality of the material making up these members. Efforts have also included reducing the diameter of these members to increase their flexibility. Still further, heat resistance of load carrying members has been enhanced by the use of different treatment agents. The heat resistance of the belt rubber may be improved by using different compositions, such as hydrogenated nitrile rubber, etc.

In JP-A 2008-101728, there is a focus on improving the heat resistance of rubber. To achieve this end, hydrogenated nitrile rubber is mixed with an unsaturated carboxylic acid metal salt to define a rubber composition that forms the belt teeth. The disclosed rubber composition is not believed to have either a hardness or modulus that is at an adequate level. As a result, the teeth may be prone to cracking, as demonstrated by running testing performed under high load, before the end of an adequate useful life. More specifically, toothed belts with this composition used with machines in industries that require high load transmission capability tend to be compromised by showing wear at the bottom of the teeth at which loads of a heavy nature are applied. Additionally, cracks may tend to generate at the bottom of the teeth where the aforementioned wearing occurs.

Alternatively, as disclosed in JP-A 2000-27949, a rubber composition is formed by mixing organic peroxide and ethylenically unsaturated carboxylic acid metal salt into a synthetic rubber that has a completely saturated main chain. This rubber is used for the teeth on a belt with the objective of providing good dynamic fatigue resistance. However, since the rubber composition uses a synthetic rubber with a completely saturated main chain, the cross-linking reaction between polymers would appear to be insufficient and, as a result, the teeth may not be made with the necessary stiffness.

SUMMARY OF THE INVENTION

In one form, the invention is directed to a power transmission belt with a body having a length, an inside and an outside. The body has teeth spaced along the length of the body and is made from rubber in which at least one load carrying member is embedded. The load carrying member extends lengthwise of the body. The rubber in the body includes: a) 3 to 7 parts by mass of short fiber blended relative to 100 parts by mass of a polymer consisting of a hydrogenated nitrile rubber including unsaturated carboxylic acid metal salt formed by mixing the hydrogenated nitrile rubber and the unsaturated carboxylic acid metal salt at a mass ratio of from 100:100 to 100:180; and b) no more than 10 parts by mass of a powdery inorganic filler blended relative to 100 parts by mass of the polymer.

In one form, the power transmission belt further includes a cloth covering. The teeth are at one of the inside and outside of the body. The cloth covering has a first surface applied to the one of the inside and outside of the body and an oppositely facing second surface.

In one form, the powdery inorganic filler is blended at no more than 5 parts by mass relative to 100 parts by mass of the polymer.

In one form, the powdery inorganic filler is carbon black.

In one form, the cloth covering has a multiple weave construction having a warp and a plurality of different wefts.

In one form, the warp is made up of nylon fiber.

In one form, the weft exposed at the second surface of the cloth covering is made up of fluorine-containing fiber.

In one form, a low melting point fiber, that is molten at a vulcanization temperature for the power transmission belt, is arranged around the fluorine-containing fiber.

In one form, the body rubber in a vulcanized state has a storage elastic modulus (E') measured at 70° C. according to JIS K6394 that is from 200 to 300 MPa and a loss factor (Tan δ) within a range of 0.1 to 0.2.

In one form, the unsaturated carboxylic acid metal salt is a salt formed by the ionic bond of an unsaturated carboxylic acid made up of at least one carboxyl group and a metal.

In one form, the unsaturated carboxylic acid is at least one of: a) monocarboxylic acid such as acrylic acid and methacrylic acid; and b) dicarboxylic acid such as maleic acid, fumaric acid, and itaconic acid.

In one form, the metal is at least one of magnesium, titanium, iron, copper, zinc, aluminum, lead and nickel.

In one form, the hydrogenated nitrile rubber is an unsaturated rubber with an iodine value from 7 to 30 mg/100 mg.

In one form, the iodine value is from 11 to 28 mg/100 mg.

In one form, the short fiber is at least one of aramid fiber, PBO (polyparaphenylene benzobisoxazole) fiber, polyvinyl alcohol fiber, and carbon fiber.

In one form, the at least one load carrying member has at least one cord formed using twisted fibers.

In one form, the cloth covering is in the form of a fibrous textile that is one of a flat-woven textile, a twill textile, and a satin textile.

In one form, the cloth covering is in the form of a fibrous textile, made up of at least one of aramid fiber, urethane elastic yarn, and an aliphatic fiber that is at least one of 6-nylon, 66-nylon, polyester, and polyvinyl alcohol.

In one form, the wefts are made up of at least one of fluorine-containing fiber, nylon fiber, and urethane elastic fiber.

In one form, the low melting point fiber is at least one of polyamide-based fiber, polyester-based fiber, and olefin-based fiber with a melting point of less than 165° C.

DETAILED DESCRIPTION OF THE PREFERRED EMBODIMENT

Figure 1:
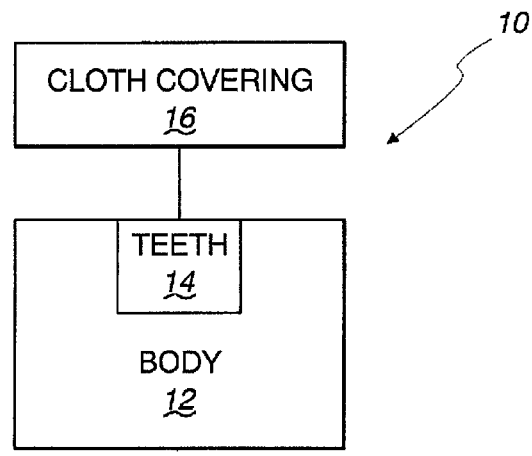
FIG. 1 is a schematic representation of a toothed power transmission belt, according to the present invention.

In FIG. 1, a power transmission belt, according to the present invention, is shown schematically at 10 and consists of an elongate body 12 with teeth 14 spaced at lengthwise intervals therealong. A cloth covering 16 is applied over exposed surfaces of the teeth 14 that are at one of the inside and outside of the belt body 12.

Figure 2:
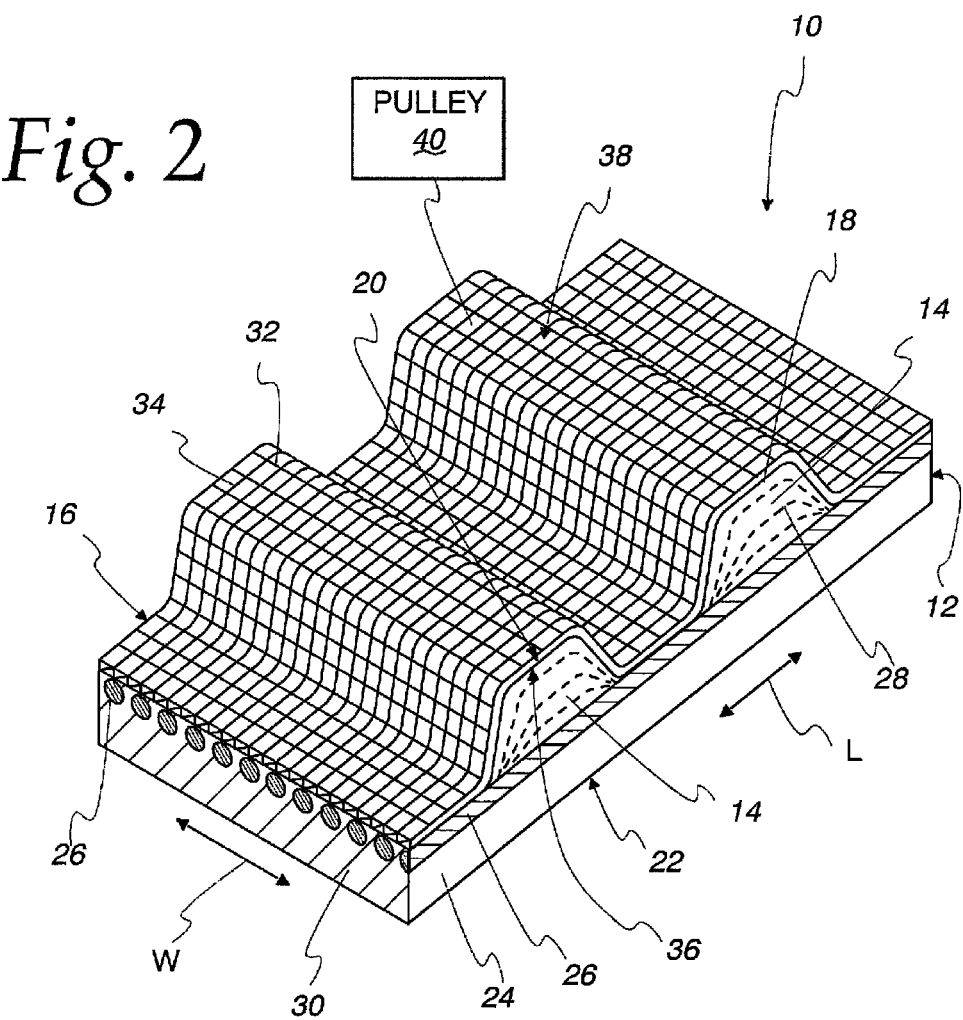
FIG. 2 is a fragmentary, perspective view of one specific form of toothed belt as shown in FIG. 1.

A more specific form of the power transmission belt 10 is shown in FIG. 2 having the body 12 with teeth 14 spaced at regular intervals along the length of the belt body 12, as indicated by the double-headed arrow L. The cloth covering 16 is applied over the teeth 14 at a body surface 18 that is on the inside 20 of the body 12. The outside of the body is identified at 22, with it understood that the characterizations "inside" and "outside" are arbitrary and could be reversed depending upon the configuration and mounting of the belt 10.

The body 12 is made with a rubber composition 24 within which at least one load carrying member 26 is embedded. In this embodiment, the load carrying member 26 actually consists of either separate cords or a spirally wrapped cord with turns spaced from each other along the width of the belt, as indicated by the double-headed arrow W.

Short fibers 28 are embedded in the rubber composition 24 within the teeth 14. The fibers 28 have a length that conforms generally to the tooth profile near the inside 20 of the body 12. The fibers 28 progressively assume a more flattened profile near the load carrying member 26, at which the fibers 28 are oriented with their lengths approximately parallel to the load carrying member 26.

The rubber composition in the body 12, making up the teeth 14 and belt back part 30, is a polymer that may be, in addition to hydrogenated nitrile rubber (HNBR), a polymer having improved heat aging resistance such as chlorosulfonated polyethylene (CSM) and alkylated chlorosulfonated polyethylene (ACSM). Preferably, only hydrogenated nitrile rubber containing unsaturated carboxylic acid metal salt is used as a polymer for at least the teeth 14.

The tooth polymer is made with hydrogenated nitrile rubber and unsaturated carboxylic acid metal salt in a mass ratio preferably of from 100:100 to 100:180. Within this range, the teeth 14 have a hardness that makes them resistant to cracking in use.

If the mass ratio of the unsaturated carboxylic acid metal salt is less than 100 relative to 100 of the hydrogenated nitrile rubber, the teeth 14 may not be sufficiently hard, as a result of which the overall durability of the belt 10 may be significantly diminished. Failure such as tooth cracks, etc. may result.

On the other hand, if the mass ratio of the unsaturated carboxylic acid metal salt exceeds 180 relative to 100 of the hydrogenated nitrile rubber, the teeth 14 may become too hard. While this hardness may reduce the deformation of the teeth 14, the overall bending characteristics of the belt 10 may be detrimentally compromised. In actuality, the more preferred mass ratio of the hydrogenated nitrile rubber and the unsaturated carboxylic acid metal salt is from 100:100 to 100:170.

The hydrogenated nitrile rubber is preferably nitrile rubber having good heat resistance properties resulting from chemically hydrogenating an unsaturated bond (carbon-carbon double bond) in the conventional nitrile rubber to limit the recombination reaction during heat aging. This prevents aging of the rubber elastically due to the recombination reaction of sulphur during heat aging, while maintaining oil resistance that is a desirable property of conventional nitrile rubber. The unsaturated carboxylic acid metal salt is a salt formed by the ionic bond of an unsaturated carboxylic acid having one, or two or more, carboxyl groups and a metal. Examples of unsaturated carboxylic acids are monocarboxylic acids such as acrylic acid and methacrylic acid, and dicarboxylic acids such as maleic acid, fumaric acid and itaconic acid. Examples of metals are magnesium, titanium, iron, copper, zinc, aluminum, lead and nickel.

The hydrogenated nitrile rubber used is preferably an unsaturated rubber having an iodine value of from 7-30 mg/100 mg, and more preferably 11-28 mg/100 mg. "Unsaturated rubber" means a rubber having an unsaturated bond consisting of a carbon-carbon double bond ($C=C$ bond) in the polymer molecular chain. The iodine value is a barometer of the amount of the unsaturated bonding. A higher iodine value represents a larger amount of the unsaturated bonding contained in the chain of the molecular polymer structure. The iodine value can be obtained by adding excess iodine to a sample to be measured and reacting them completely (the reaction between iodine and the unsaturated bond), and then quantitatively measuring the amount of remaining iodine by oxidation-reduction titration.

When the iodine value of hydrogenated nitrile rubber is less than 7 mg/100 mg, the cross-linking reaction between hydrogenated nitrile rubbers is insufficient to lower the stiffness of the teeth 14 to the desired level. As a result, failures, such as tooth cracking, might occur during belt operation.

On the other hand, when the iodine value of hydrogenated nitrile rubber exceeds 30 mg/100 mg, the amount of the unsaturated bonding is excessive. Lowering of heat resistance or deterioration due to oxidation of the teeth 14 might detrimentally shorten the operating life for the belt.

The short fibers 28 are blended in an amount of from 3 to 7 parts by mass relative to 100 parts by mass of a polymer consisting solely of hydrogenated nitrile rubber containing unsaturated carboxylic acid metal salt. In this amount, the fibers 28 raise the modulus of the rubber in the teeth 14 lengthwise of the body 12, thereby reducing the likelihood of tooth cracking.

If the blended amount of the short fibers 28 is less than 3 parts by mass, there may result a low storage elastic modulus (E') for the rubber composition in the teeth 14. As a result, deformation of the teeth 14 may become excessive with the belt traveling under heavy load, which may cause the generation of cracks in the teeth 14.

If the blended amount of the short fibers 28 exceeds 7 parts by mass, the storage elastic modulus (E') of the rubber composition in the teeth may be too high. The teeth 14 may thus show little deformation as a result of which meshing with the cooperating pulley may be impaired. This may lead to significant tooth damage.

The precise composition of the short fibers 28 is not critical to the present invention. Fibers with a high modulus are preferred such as, for example, aramid fiber, PBO (polyparaphenylene benzobisoxazole) fiber, polyvinyl alcohol fiber, and carbon fiber.

The powdery inorganic filler is blended in an amount of 10 parts by mass or less relative to 100 parts by mass of the polymer consisting solely of hydrogenated nitrile rubber containing unsaturated carboxylic acid metal salt. In this amount, heat generation in the tooth rubber can be suppressed so as to contribute to belt life.

If the blended amount of the powdery inorganic filler exceeds 10 parts by mass, there may be excessive heat generation in the rubber composition in the belt teeth 14. The heat resistance of the rubber composition may thus lower to the point that cracks may generate or crevices may be formed through a heat aging process.

With the polymer, consisting solely of the hydrogenated nitrile rubber containing unsaturated carboxylic acid metal salt, formed by mixing the hydrogenated nitrile rubber and the unsaturated carboxylic acid metal salt at a mass ratio of from 100:100 to 100:180, the hardness of the rubber composition in the teeth 14 has been found to be adequate. As a result, a powdery inorganic filler, such as carbon black or silica, is not required to be blended therein. However, carbon black may be blended to a degree that can color the rubber composition in the teeth 14. The amount is preferably 10 parts by mass or less, and more preferably 5 parts by mass or less.

The carbon black is used as a coloring agent for the rubber composition to produce a black color. As noted above, with the hydrogenated nitrile rubber and the unsaturated carboxylic acid metal salt in a mass ratio of from 100:100 to 100:180, the hardness of the teeth 14 is sufficient that little or no powdery inorganic filler, such as carbon black or silica, is required. Conventionally, the blended amount of carbon black is 40 parts by mass, as shown in Table 1 of JP-A 2008-101728. In contrast, the blended amount of carbon black contemplated with the above proportions is 10 parts by mass or less.

Preferably, the rubber composition in the teeth 14 has a hardness of from 95 degree to 98 degree according to the JIS-A hardness standard, and a 20% extension modulus of no less than 20 MPa. One preferred rubber having such a high modulus is a composition formed by finely dispersing zinc polymethacrylate, an unsaturated carboxylic acid metal salt, in hydrogenated nitrile rubber to a high degree (commercial product name: ZSC, manufactured by ZEON CORPORATION), and blending carbon black, silica and short fibers for reinforcement. This raises the modulus of the toothed belt and consistent effective meshing of the teeth with a cooperating pulley results, even when the belt is traveling under heavy load.

The vulcanized material of the rubber composition in the teeth preferably has E' of from 200-300 MPa, measured at an atmospheric temperature of 70° C. according to JIS K6394 and with a loss factor (Tan δ) within the range of 0.1 to 0.2. Within this range, the modulus of the tooth rubber is normally adequately high, and thus failures are not likely to occur. Since deformation of the teeth is suppressed, desired meshing with a cooperating toothed pulley takes place consistently, as a result of which durability is more likely to be satisfactory for the belt. Heat generation is suppressed that is caused as the teeth deform upon meshing with, and disengaging from, a cooperating pulley.

E' is an elastic modulus obtained from dynamic testing in which periodic vibration is induced and defined as a ratio of strain and elastic stress of the same phase. An object having higher E' resists shape change and may deform very little even under strong external forces as imparted during operation under high loads. Thus, cracking, breakage, etc. are not likely to occur.

On the other hand, when E' is low, the rubber readily changes shape. Breakage and destruction of the belt may occur readily even with the belt subjected to only relatively small external forces.

Tan δ is a value obtained by dividing loss elastic modulus (E") by E', and is a measure of the ratio of energy dissipated as heat and the maximum energy stored during one vibrational cycle. That is, Tan δ shows the degree of dissipation of vibrational energy, which is converted in the rubber composition to heat.

A greater Tan δ means that a greater proportion of energy added from the outside is converted to heat. Therefore, the temperature of the rubber composition rises. As a result of the self-heat generation, there is less heat resistance.

On the other hand, a small Tan δ means that the heat generation is suppressed and at a lower level. The heat resistance of the rubber composition is thereby improved.

In the back part 30 of the belt body 12, the embedded load carrying member 26 has side-by-side lengths spaced in the widthwise direction W. The load carrying member 26 is in the form of a large diameter twisted yarn tension member formed by twisting a large number of primary twist cords made from chemical fiber. Suitable chemical fibers are any of a PBO fiber, a polyarylate fiber, an aramid fiber, a carbon fiber, etc.

The cloth covering 16 is preferably a fibrous textile formed by weaving warps 32, extending widthwise of the belt, and wefts 34, extending lengthwise of the belt. The fibrous textile may be a flat-woven textile, a twill textile, a satin textile, or the like. The fibrous material making up the fibrous textile may be, for example, aramid fiber, urethane elastic yarn, aliphatic fiber (6-nylon, 66-nylon, polyester, polyvinyl alcohol, etc.) etc.

In a preferred form of the fibrous textile, a multiple woven (double woven) structure is formed using two kinds of wefts 34 and one kind of warp 32. With this construction, nylon fiber is used for the warp 32, with the weft made from fluorine-containing fiber, a nylon fiber, and a urethane elastic fiber.

The cloth covering 16 has a first side 36 adhered to the teeth 14 and an oppositely facing, exposed, second side 38. The weft 34 at the second side 38, that meshes with a cooperating pulley 40, is made with fluorine-containing fiber, such as PTFE, having a low coefficient of friction between the second side 38 and pulley 40, thereby to reduce friction between the cloth covering 16 and the pulley 40.

Further, this construction reduces the coefficient of friction between the cloth covering 16 and cooperating pulley 40, thereby reducing sound generation as the teeth 14 move into and out of meshed engagement with the pulley 40.

The use of a fiber other than a fluorine-containing fiber, such as nylon fiber or urethane elastic fiber, on the first side 36 makes it possible to enhance the adhering force between the cloth covering 16 and the rubber composition at the surface 18 on the teeth 14.

Around the fluorine-containing fiber, a low melting point fiber is arranged. The low melting point fiber has a melting point that preferably causes the fiber to be molten or melt at a vulcanization temperature for the belt body 12. It is contemplated that a fluorine-containing fiber and a low melting point fiber might be intertwisted with each other. Alternatively, a fluorine-containing fiber may be covered by a low melting point fiber. Other constructions are contemplated.

No particular restriction is imposed on the vulcanization conditions, such as vulcanization temperature and vulcanization time for the belt body 12. The condition is determined typically by referring to a vulcanization curve measured using a Mooney viscometer, or another vulcanization behavior measuring device, taking into consideration the kind of vulcanization agent or a vulcanization-accelerating agent, and the vulcanization means. General vulcanization conditions normally involve a vulcanization temperature of 100°-200° C. for a time from one minute to five hours. If necessary, secondary vulcanization may be performed.

The low melting point fiber is molten at the vulcanization temperature for the body 12 so that the fiber flows into the spaces between fibers making up the cloth covering 16. The low melting point fiber thereafter crystallizes by cooling the system to a temperature below the melting point. As a result, break/fly of the fluorine-containing fiber, potentially caused by shock or wear occurring at the surface of the tooth cloth covering 16 when the tooth runs in or out of the cooperating pulley, can be suppressed. This reduces the likelihood of tooth cracking and may result in a longer operating life for a belt, even travelling under high load conditions.

Suitable low melting point fibers are, for example, polyamide-based fiber, polyester-based fiber, or olefin-based fiber having melting points of less than 165° C., and more preferably less than 150° C.

Polyamide-based fiber usable for the low melting point fibers may be fibers of copolymerized polyamides consisting of the combination of a W-aminocarboxylic acid component or a dicarboxylic component and diamine.

For the polyester-based fiber, core-sheath type complex fibers are preferred. The polyester-based polymer of the core component preferably has a melting temperature higher than the vulcanization temperature of the body 12 and may be, for example, polyethylene terephthalate, polybutylene terephthalate, or a copolymer thereof.

The copolymerized polyester of the sheath component has a melting temperature lower than the vulcanization temperature and is obtained by polycondensation reaction of dibasic acid and diol. Examples thereof include terephthalic acid and diethylene glycol as base materials, and isophthalic acid, adipic acid, sebacic acid, butane diol, hexane diol, polyethylene glycol, neopentyl glycol, etc. as a copolymerizing component. The combination and copolymerization ratio thereof may be controlled to adjust the melting point.

Examples of olefin-based fibers include polypropylene fiber, polyethylene fiber (for example, high density polyethylene fiber, medium density polyethylene fiber, low density polyethylene fiber, linear low density polyethylene fiber, ultra-high molecular weight polyethylene fiber, etc.), etc.

Fibers obtained by copolymerization of the above components are usable. No particular restriction is placed on the twisting method and constitution of the fiber. It is desirable that the fiber melts at the vulcanization temperature for the body 12.

Additionally, the surface of the low melting point fibers may be subjected to a plasma treatment, or the like, for improving the affinity to an adhesive treatment agent.

The cloth covering 16 is adhered to the rubber in the teeth 14 through a series of adhesive treatments including the following treatments.

Treatment 1

The fibrous textile making up the cloth covering 16 is immersed in a resorcinol-formalin-rubber latex treating liquid (hereinafter, referred to as an RFL treating liquid), and thereafter dried.

To the RFL treating liquid, at least one vulcanization aid from among aqueous dispersions of sulphur compounds, quinone oxime-based compounds, methacrylate-based compounds and maleimide-based compounds, or dispersions of these vulcanization aids in water, is added.

For the aqueous dispersion of a sulphur compound, for example, the aqueous dispersion of sulphur, treamethyl thirum disulfide, etc. are usable. As the quinone oxime-based compound, for example, p-quinone dioxime, etc. may be used. As the methacrylate-based compound, for example, ethylene glycol dimethacrylate, trimethylolpropane trimethacrylate, etc. may be used. As the maleimide-based compound, for example, N,N'-m-phenylenebismaleimide, N,N'-(4,4'-diphenylmethanebismaleimide), etc. may be used.

"Water" in the above phrase "dispersions of these vulcanization aids in water" may include, for example, some amount of alcohol such as methanol. This raises the affinity of the vulcanization aid, even when the vulcanization aid is insoluble in water, to make it easier to disperse the vulcanization aid.

The addition of the vulcanization aid to the RFL treating liquid, as described above, has the following effects. The chemical bonding force between the rubber latex component contained in the RFL treating liquid and an outer layer rubber (means rubber cement or rolled rubber used in rubber cement treatment or coating treatment—when the coating treatment is omitted, means the rubber in the teeth 14) is strengthened to improve adhesiveness. The occurrence of detachment of the cloth covering 16 is thus suppressed.

A further positive effect is that the chemical bonding force (cross-linking force) of the rubber latex component itself contained in the RFL treating liquid is strengthened. As a result, detachment caused by the destruction of the outer layer rubber, that is the object to be adhered, precedes the detachment caused by the cohesive failure of the adhesion layer; that is, interlayer detachment.

When the vulcanization aid is added to the RFL treating liquid, the immersion treatment of the fibrous textile may be practiced twice. In the first RFL immersion treatment, no vulcanization aid, as described above, is added to the RFL treating liquid. The reason is that, in the first treatment process, priority is given the thermal curing of RF over the cross-linking of the rubber latex component.

On the other hand, in the second RFL immersion treatment, an RFL treating liquid is used, which contains more rubber latex component than the RFL treating liquid used in the first treatment and at least one vulcanization aid from amongst aqueous dispersions of sulphur compounds, quinone oxime-based compounds, methacrylate-based compounds and maleimide-based compounds, or dispersions of these vulcanization aids in water, is used. The reason why the ratio of the rubber latex component of the RFL treating liquid between the first and second immersion treatments is different is to raise the adhesiveness of the RFL layer relative to both the fiber and rubber, that have different affinities.

Treatment 2

Two kinds of rubber cement treatments (P1 treatment, S1 treatment) are performed, in which an adhesive treatment agent containing a rubber cement, formed by dissolving a rubber composition in a solvent, is stuck to the fibrous textile, which is then subjected to a baking treatment.

Treatment 3

Onto the surface of the fibrous textile, a rubber cement and a rolled rubber are applied, in this order. The process is also called a coating treatment. "In this order" means "in this order from the fibrous textile toward the teeth 14." Here, when the vulcanization aid is added to the RFL treating liquid, preferably the same vulcanization aid is added to the rubber cement and rolled rubber. This results in a significant improvement in the adhesive force between the fibrous textile treated with the RFL treating liquid and the rubber cement.

It is not necessary to perform all of the above Treatments 1-3, and, according to need, any one, or two or more of the Treatments, may be performed in combination. For example, when the vulcanization aid is added to the RFL treating liquid in Treatment 1, since this treatment alone considerably increases the adhesive force between the fibrous textile and the rubber, the rubber cement in Treatment 2 may be omitted.

A durability test using a biaxial high-load traveling testing machine was performed to analyze the performance of toothed belts according to the present invention (hereinafter, "Inventive Examples").

Testing was performed using the following:

Testing machine: biaxial high load traveling testing machine

Evaluated belt: belt tooth number: 100 teeth; tooth shape: round tooth; tooth pitch: 14 mm; belt width: 20 mm; belt pitch line: 1400 mm Driving pulley tooth number: 28 teeth Driven pulley tooth number: 28 teeth Preset tension: 530 N Rotational speed: 1800 rpm Load: 4181 N for driven pulley Measuring temperature: 25° C. (room temperature).

For the load carrying member of the belt, a cord made of aramid fiber having a raw yarn fineness of 167 tex, a constitution of 3/6 and a twist multiplier of 2.0, was used.

The rubber blending and constitution of the cloth covering for the belt used in the durability test are listed in Tables 1, 2 and 3, below. In Tables 1 and 2, for each of the 15 kinds of rubber blendings used (Inventive Examples: R-0 to R-6, R-14, Comparative Examples: R-7 to R-13), the hardness (JIS-A hardness) and M20 (20% extension modulus: MPa) are also listed.

TABLE 1

| Rubber Blending | R-0 | R-1 | R-2 | R-3 | R-4 | R-5 | R-6 | R-14 |
| --- | --- | --- | --- | --- | --- | --- | --- | --- |
| Hydrogenated nitrile rubber *1 | 0 | 0 | 0 | 0 | 0 | 0 | 10 | 4.5 |
| Unsaturated carboxylic acid metal salt + HNBR complex polymer *2 | 100 | 100 | 100 | 100 | 100 | 0 | 0 | 95.5 |
| Unsaturated carboxylic acid metal salt + HNBR complex polymer *3 | 0 | 0 | 0 | 0 | 0 | 100 | 90 | 0 |
| Aromatic polyamide fiber *4 | 5 | 5 | 5 | 5 | 7 | 3 | 5 | 5 |
| Stearic acid | 0.5 | 0.5 | 0.5 | 0.5 | 0.5 | 0.5 | 0.5 | 0.5 |
| Carbon black SRF | 0 | 2 | 5 | 10 | 2 | 2 | 2 | 0 |
| Silica | 0 | 0 | 0 | 0 | 0 | 0 | 0 | 0 |
| Zinc oxide | 5 | 5 | 5 | 5 | 5 | 5 | 5 | 5 |
| Plasticizer | 0 | 0 | 0 | 0 | 0 | 0 | 0 | 0 |
| Antiaging agent | 1.5 | 1.5 | 1.5 | 1.5 | 1.5 | 1.5 | 1.5 | 1.5 |
| Vulcanization aid | 1 | 1 | 1 | 1 | 1 | 1 | 1 | 1 |
| Organic peroxide *5 | 2 | 2 | 2 | 2 | 2 | 2 | 2 | 2 |
| Total Mass | 115 | 117 | 120 | 125 | 119 | 115 | 117 | 115 |
| HNBR/unsaturated carboxylic acid metal salt (mass ratio) | 100/110 | 100/110 | 100/110 | 100/110 | 100/110 | 100/170 | 100/130 | 100/100 |
| Hardness (JIS-A) [degree] | 97 | 97 | 97 | 96 | 97 | 98 | 97 | 96 |
| 20% extension modulus [Mpa] | 26 | 26 | 26 | 26 | 30 | 35 | 25 | 24 |

*1 Zetpol2010, by ZEON CORPORATION: unsaturated carboxylic acid metal salt:hydrogenated nitrile rubber = 0:100, iodine value 11/mg/100 mg
*2 ZSC2295CX, by ZEON CORPORATION: unsaturated carboxylic acid metal salt:hydrogenated nitrile rubber = 110:100, iodine value 28 mg/100 mg
*3 ZSC2298L, by ZEON CORPORATION: unsaturated carboxylic acid metal salt:hydrogenated nitrile rubber = 170:100, iodine value 28 mg/100 mg
*4 Cornex short fiber, by TEIJIN
*5 1,3-bis(t-butylperoxyisopropyl) benzene

TABLE 2

| Rubber blending | R-7 | R-8 | R-9 | R-10 | R-11 | R-12 | R-13 |
| --- | --- | --- | --- | --- | --- | --- | --- |
| Hydrogenated nitrile rubber *1 | 0 | 60 | 50 | 30 | 20 | 0 | 0 |
| Unsaturated carboxylic acid metal salt + HNBR complex polymer *2 | 100 | 40 | 50 | 70 | 80 | 100 | 100 |
| Unsaturated carboxylic acid metal salt + HNBR complex polymer *3 | 0 | 0 | 0 | 0 | 0 | 0 | 0 |
| Aromatic polyamide fiber *4 | 2 | 5 | 5 | 5 | 5 | 5 | 5 |
| Stearic acid | 0.5 | 0.5 | 0.5 | 0.5 | 0.5 | 0.5 | 0.5 |
| Carbon Black SRF | 2 | 2 | 2 | 2 | 2 | 0 | 15 |
| Silica | 0 | 0 | 0 | 0 | 0 | 15 | 0 |
| Zinc oxide | 5 | 0 | 5 | 5 | 5 | 5 | 5 |
| Plasticizer | 0 | 0 | 6 | 6 | 0 | 0 | 0 |
| Antiaging agent | 1.5 | 1.5 | 1.5 | 1.5 | 1.5 | 1.5 | 1.5 |
| Vulcanization aid | 1 | 2 | 1 | 1 | 1 | 1 | 1 |
| Organic Peroxide *5 | 2 | 2 | 2 | 2 | 2 | 2 | 2 |
| Total Mass | 114 | 113 | 123 | 123 | 117 | 130 | 130 |
| HNBR/unsaturated carboxylic acid metal salt (mass ratio) | 100/110 | 100/27 | 100/35 | 100/58 | 100/72 | 100/110 | 100/110 |
| Hardness (JIS-A) [degree] | 97 | 94 | 91 | 93 | 93 | 98 | 98 |
| 20% extension modulus (Mpa) | 20 | 10 | 12 | 12 | 12 | 24 | 27 |

*1 Zetpol2010, by ZEON CORPORATION: unsaturated carboxylic acid metal salt:hydrogenated nitrile rubber = 0:100, iodine value 11 mg/100 mg
*2 ZSC2295CX, by ZEON CORPORATION: unsaturated carboxylic acid metal salt:hydrogenated nitrile rubber = 110:100, iodine value 28 mg/100 mg
*3 ZSC2298L, by ZEON CORPORATION: unsaturated carboxylic acid metal salt:hydrogenated nitrile rubber = 170:100, iodine value 28 mg/100 mg
*4 Cornex short fiber, by TEIJIN
*5 1,3-bis(t-butylperoxyisopropyl)benzene

TABLE 3

| Cloth covering constitution | F-1 | F-2 |
|---|---|---|
| Weave constitution | Weft two-color double woven front 1/3 twill, rear 2/2 twill | Weft two-color double woven front 1/3 twill, rear 2/2 twill |
| Warp | 66-nylon | 66-nylon |
| Weft-1 | PTFE fiber *1 Urethane elastic yarn | PTFE fiber *1 Polyester fiber *2 Urethane elastic yarn |
| Weft-2 | 66-nylon Urethane elastic yarn | 66-nylon Urethane elastic yarn |

*1 PTFE fiber: Toyoflon 1330 dtox, by Toray
*2 polyester-based fiber: Cornetta by Unikika As shown in Table 3, in two of the cloth coverings, to the weft of F-1, a PTFE fiber, that was a fluorine-containing fiber, was blended. In the tooth cloth of F-2, to the weft, not only a PTFE fiber but also a polyester-based fiber, in the form of a low melting point fiber having a melting point that leads to the melting at the vulcanizing temperature, was blended. The rubber vulcanizing conditions for the belt used in the test was a vulcanizing temperature of 165° C. and a vulcanizing time of 30 minutes. The polyester-based fiber used in the Inventive Example (Cornetta, manufactured by UNITIKA, LTD.) had a core part melting temperature of 256° C. and a sheath part melting temperature of 160° C.

Tables 4, 5 and 6, below, show the blending of the RFL treating liquid, blending of the rubber cement treatment (P1 treatment and S1 treatment), and rubber blending for the coating treatment, respectively, used for the adhesive treatment for the cloth covering.

TABLE 4

| RFL blending | | |
|---|---|---|
| Blending | B-1 | B-2 |
| Hydrogenated nitrile rubber latex (40% by mass) | 100 | 100 |
| RF condensate (20% by mass) | 50 | 25 |
| NaOH aqueous solution (10% by mass) | 0 | 2 |
| Maleimide-based compound aqueous dispersion (50% by mass) | 0 | 20 |
| Water | 110 | 110 |

Unit: part by mass

TABLE 5

P1 treatment (isocyanate-containing rubber cement treatment) blending,
S1 treatment (rubber cement treatment) blending

| Blending | Rubber cement for P1 | Rubber cement for S1 |
|---|---|---|
| Blending for rubber of hydrogenated nitrile rubber cement | 5 | 15 |
| Polymeric MDI | 5 | 0 |
| Methyl ethyl ketone | 90 | 85 |

Unit: part by mass

TABLE 6

| Rubber blending for coating treatment | |
|---|---|
| Rubber blending | C-1 |
| Hydrogenated nitrile rubber *1 | 50 |
| Hydrogenated nitrile rubber *2 | 50 |
| Zinc oxide | 2 |
| Stearic acid | 1 |
| Silica | 50 |
| Carbon black | 0 |
| Antiaging agent | 2 |
| Vulcanization aid *3 | 2 |
| Organic peroxide *4 | 2 |
| Plasticizer (ether-based) | 10 |

*1 Zetpol, by ZEON CORPORATION
*2 ZSC, by ZEON CORPORATION
*3 maleimide-based compound
*4 1,3-bis(t-butylperoxyisopropyl)benzene Sixteen different belts (Inventive Examples 1 to 9, Comparative Examples 1 to 7) were formed using the identified rubber blending, cloth covering on, and cloth covering adhesive treatment by a preform working method. The preform working method is a working method in which a cloth covering and a tooth part are previously molded using a die having a toothed mold to pre-form a body. A tension member is spun in a spiral shape on the body. Unvulcanized rubber, forming a belt back part, is thereafter applied. This entire assembly is then vulcanized using a vulcanizing can.

In the preform working method, since the cloth covering and teeth are molded prior to the vulcanization, it is unnecessary to form the teeth by flowing unvulcanized rubber, making up the belt back part, into the inside (ventral side) through a widthwise gap between spaced lengths of load carrying members and straining the cloth covering. It thus becomes possible to narrow the widthwise interval (pitch) between lengths of the load carrying members. Accordingly, when a high modulus belt is to be manufactured, the preform working method is desirable because it enables the pitch of the load carrying member/cords in the belt width direction to be narrowed to approximately that of the member/cord diameter.

For these 16 kinds of belts, a durability test was performed under the above-described test conditions. Tables 7 and 8 show the results.

TABLE 7

| | Inventive Example: "Ex" | | | | | | | | |
|---|---|---|---|---|---|---|---|---|---|
| Evaluated belt | Ex 1 | Ex 2 | Ex 3 | Ex 4 | Ex 5 | Ex 6 | Ex 7 | Ex 8 | Ex 9 |
| Rubber blending | R-0 | R-1 | R-2 | R-3 | R-4 | R-5 | R-6 | R-1 | R-5 |
| Tooth cloth covering | F-2 | F-2 | F-2 | F-2 | F-2 | F-2 | F-2 | F-1 | F-1 |

TABLE 7-continued

Inventive Example: "Ex"

| Evaluated belt | Ex 1 | Ex 2 | Ex 3 | Ex 4 | Ex 5 | Ex 6 | Ex 7 | Ex 8 | Ex 9 |
|---|---|---|---|---|---|---|---|---|---|
| Tooth cloth covering adhesive treatment | | | | | | | | | |
| First RFL | B-1 | B-1 | B-1 | B-1 | B-1 | B-1 | B-1 | B-1 | B-1 |
| Second RFL | B-2 | B-2 | B-2 | B-2 | B-2 | B-2 | B-2 | B-2 | B-2 |
| P1 treatment | Yes | Yes | Yes | Yes | Yes | Yes | Yes | Yes | Yes |
| S1 treatment | Yes | Yes | Yes | Yes | Yes | Yes | Yes | Yes | Yes |
| Coating treatment | C-1 | C-1 | C-1 | C-1 | C-1 | C-1 | C-1 | C-1 | C-1 |
| Tension member pitch (mm) | 2.3 | 2.3 | 2.3 | 2.3 | 2.3 | 2.3 | 2.3 | 2.3 | 2.3 |
| Belt width (mm) | 20 | 20 | 20 | 20 | 20 | 20 | 20 | 20 | 20 |
| Traveling operating life (hrs) | 119 | 117 | 115 | 100 | 115 | 120 | 100 | 100 | 103 |
| Dynamic elastic modulus E' (70° C.) [Mpa] | 218 | 220 | 225 | 234 | 240 | 280 | 220 | 220 | 280 |
| Loss coefficient Tanδ (70° C.) | 0.165 | 0.167 | 0.170 | 0.178 | 0.180 | 0.190 | 0.180 | 0.167 | 0.190 |

TABLE 8

Comparative Example: Comp Ex

| Evaluated Belt | Comp Ex 1 | Comp Ex 2 | Comp Ex 3 | Comp Ex 4 | Comp Ex 5 | Comp Ex 6 | Comp Ex 7 |
|---|---|---|---|---|---|---|---|
| Rubber blending | R-7 | R-8 | R-9 | R-10 | R-11 | R-12 | R-13 |
| Tooth cloth covering | F-2 | F-2 | F-2 | F-2 | F-2 | F-2 | F-2 |
| Tooth cloth covering adhesive treatment | | | | | | | |
| First RFL | B-1 | B-1 | B-1 | B-1 | B-1 | B-1 | B-1 |
| Second RFL | B-2 | B-2 | B-2 | B-2 | B-2 | B-2 | B-2 |
| P1 treatment | Yes | Yes | Yes | Yes | Yes | Yes | Yes |
| S1 treatment | Yes | Yes | Yes | Yes | Yes | Yes | Yes |
| Coating treatment | C-1 | C-1 | C-1 | C-1 | C-1 | C-1 | C-1 |
| Tension member pitch (mm) | 2.3 | 2.3 | 2.3 | 2.3 | 2.3 | 2.3 | 2.3 |
| Belt width (mm) | 20 | 20 | 20 | 20 | 20 | 20 | 20 |
| Traveling operating life (hrs) | 70 | 4 | 22 | 29 | 47 | 80 | 70 |
| Dynamic elastic modulus E' (70° C.) [Mpa] | 190 | 129 | 99 | 129 | 188 | 230 | 240 |
| Loss coefficient Tanδ (70° C.) | 0.160 | 0.219 | 0.117 | 0.138 | 0.159 | 0.210 | 0.220 |

For the vulcanized rubber composition for the 16 kinds of belts, E' and Tan δ were measured at a temperature of 70° C. A sample was made according to J1S K6394. The vulcanization was performed at a temperature of 165° C. for 30 minutes. The measurement conditions were as follows.

Name of testing machine: viscoelasticity measuring apparatus VR7121, manufactured by Ueshima Seisakusho Co., Ltd.

Sample size: thickness 2 mm×width 4 mm×length 40 mm
Measured temperature range: −40° C. to 150° C.
Temperature rising rate: 1° C./min
Initial strain: 1%
Dynamic strain: 0.5%
Frequency: 10 Hz
Strain direction: direction parallel to short fiber E' and Tan δ were measured by the following method. The sample having the above size was chucked in the chucking part of the viscoelasticity measuring apparatus with an interval between chucks of 15 mm to give an initial strain of 1%. The sample was left at an atmospheric temperature of −40° C. for around 5 minutes exposed to vibration at a frequency of 10 Hz for 1.6 seconds to add an additional 0.5% strain. Next, the temperature was raised by 1° C. up to 150° C. while applying dynamic strain of 0.5% per 1° C. E' and Tan δ at 70° C. were obtained. Tables 7 and 8, above, show the results.

Figure 3:
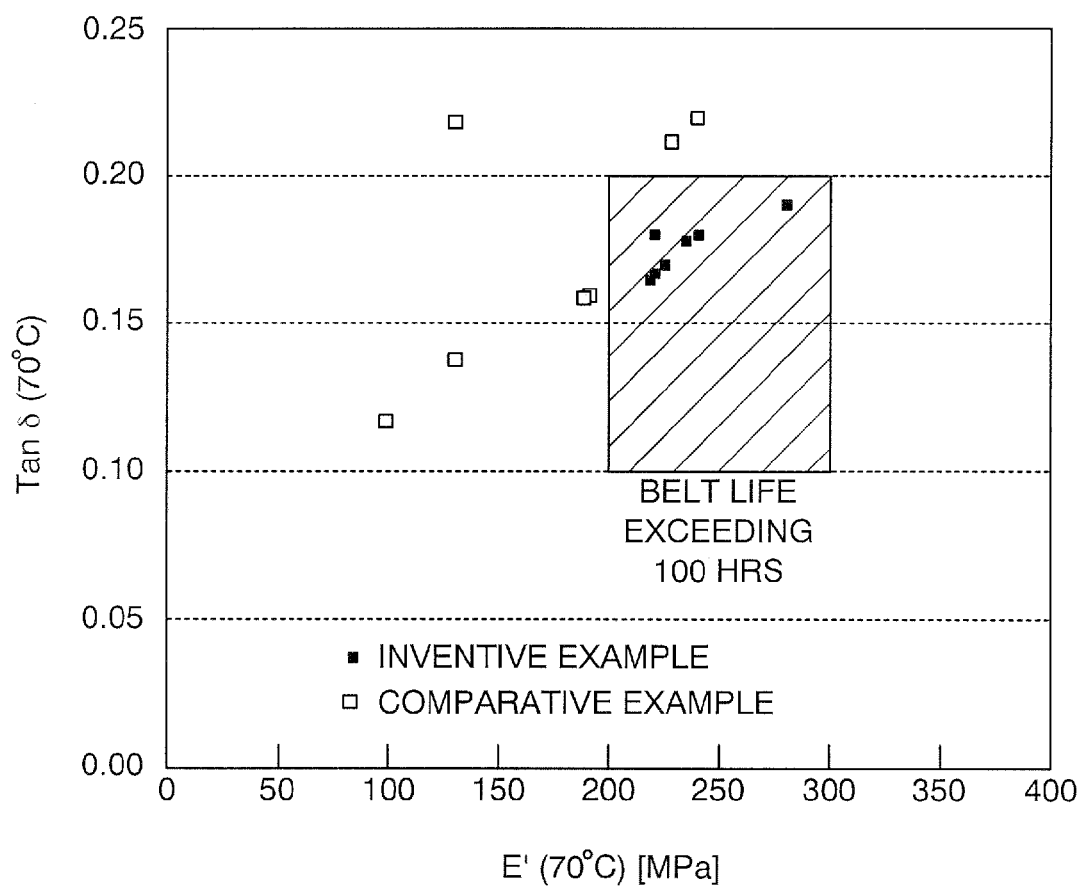
FIG. 3 is a graph showing the relationship between E' and Tan δ for vulcanized rubber used in the belt teeth at an environmental temperature of 70° C.

As seen in FIG. 3, Inventive Examples 1 to 9, in which 3 to 7 parts by mass of short fiber and 10 parts by mass or less of a powdery inorganic filler (carbon black and silica), were blended with 100 parts by mass of polymer consisting solely of hydrogenated nitrile rubber containing unsaturated carboxylic acid metal salt formed by mixing the hydrogenated nitrile rubber and the unsaturated carboxylic acid metal salt at a mass ratio of from 100:100 to 100:180 to produce a rubber composition for the teeth, had a traveling operating life exceeding 100 hours and had better durability under a high load than Comparative Examples 1 to 7.

In Inventive Examples 1 to 4, only the blending amount of carbon black was changed for the rubber composition for the teeth. The composition having a smaller blended amount of carbon black gave a more improved belt operating life. It can be concluded that Tan δ lowered the heat generation caused by the deformation of the teeth by lowering the blended amount of carbon black.

Comparative Examples 1 to 5 had a shorter belt operating life caused by such a low E'—less than 200 MPa as compared with Inventive Examples 1 to 9, which resulted in significant deformation of the teeth under high load traveling conditions, thereby generating crevices or tooth cracks.

In Comparative Example 6, 15 parts by mass of silica were blended relative to 100 parts by mass of polymer, as the rubber composition for the teeth, which had E' of 200 MPa, or more, but Tan δ as high as 0.21. The heat generation caused by the deformation of the teeth became large, and tooth cracks and tension member detachment resulted to shorten the belt operating life.

In Comparative Example 7, 15 parts by mass of carbon black were blended relative to 100 parts by mass of polymer, as the rubber composition for the teeth, which had E' of 200 MPa, or more, but Tan δ as high as 0.22. The heat generation caused by the deformation of the teeth became large, and tooth cracks and tension member detachment resulted to shorten the belt operating life.

Inventive Examples 8 and 9 are substantially the same as Inventive Examples 2 and 6, respectively, except for the condition of the cloth covering. The former had a shorter belt operating life in the traveling test. For Inventive Examples 8 and 9, this resulted from the tooth cloth F-1 not using a low melting point fiber for the weft, whereas in Inventive Examples 2 and 6, the cloth covering F-2, having a polyester-based fiber for the low melting point fiber, was used for the weft. That is, it is concluded that the low melting point fiber arranged around the fluorine-containing fiber (PTFE fiber) of the weft suppressed the break/fly of the fluorine-containing fiber to protect the rubber of the belt main body over a longer period.

As described above, it is known that by setting E' of the vulcanized material of the rubber composition used for the teeth to be 200 to 300 MPa under a temperature condition of 70° C. and Tan δ in the range from 0.1 to 0.2, the operating life of the belt was extended (see FIG. 3). Moreover, it is known that the use of the cloth covering using a polyester-based fiber with a low melting point fiber as the weft, in addition to the rubber composition, further improved the belt operating life.

The utilization of the invention can heighten the rubber hardness and modulus of the tooth part of the toothed belt to prevent tooth cracks, etc., and give the toothed belt an acceptably long operating life.

The foregoing disclosure of specific embodiments is intended to be illustrative of the broad concepts comprehended by the invention.

The invention claimed is:

1. A power transmission belt comprising:
a body having a length, an inside and an outside,
the body comprising teeth spaced along the length of the body, wherein the rubber composition in the teeth has a hardness of from 95 degree to 98 degree according to the JIS-A hardness standard,
the body comprising rubber in which at least one load carrying member is embedded,
the load carrying member extending lengthwise of the body,
wherein the rubber in the body comprises: a) 3 to 7 parts by mass of short fiber blended relative to 100 parts by mass of a polymer comprising a hydrogenated nitrile rubber comprising unsaturated carboxylic acid metal salt formed by mixing the hydrogenated nitrile rubber and the unsaturated carboxylic acid metal salt at a mass ratio of from 100:100 to 100:180; and b) 0-10 parts by mass of a powdery inorganic filler blended relative to 100 parts by mass of the polymer.

2. The power transmission belt according to claim 1 further comprising a cloth covering, wherein the teeth are at one of the inside and outside of the body and the cloth covering has a first surface applied to the one of the inside and outside of the body and an oppositely facing second surface.

3. The power transmission belt according to claim 2 wherein the powdery inorganic filler is blended at 0-5 parts by mass relative to 100 parts by mass of the polymer.

4. The power transmission belt according to claim 2 wherein the cloth covering has a multiple weave construction comprising a warp and a plurality of different wefts.

5. The power transmission belt according to claim 4 wherein the warp comprises nylon fiber.

6. The power transmission belt according to claim 5 wherein the weft exposed at the second surface of the cloth covering comprises fluorine-containing fiber.

7. The power transmission belt according to claim 6 wherein a low melting point fiber that is molten at a vulcanization temperature for the power transmission belt is arranged around the fluorine-containing fiber.

8. The power transmission belt according to claim 7 wherein the body rubber in a vulcanized state has a storage elastic modulus (E') measured at 70° C. according to JIS K6394 that is from 200 to 300 MPa and a loss factor (Tan δ) within a range of 0.1 to 0.2.

9. The power transmission belt according to claim 7 wherein the low melting point fiber comprises at least one of polyamide-based fiber, polyester-based fiber, and olefin-based fiber with a melting point of less than 165° C.

10. The power transmission belt according to claim 6 wherein the body rubber in a vulcanized state has a storage elastic modulus (E') measured at 70° C. according to J1S K6394 that is from 200 to 300 MPa and a loss factor (Tan δ) within a range of 0.1 to 0.2.

11. The power transmission belt according to claim 4 wherein the weft exposed at the second surface of the cloth covering comprises fluorine-containing fiber.

12. The power transmission belt according to claim 4 wherein the wefts comprise at least one of fluorine-containing fiber, nylon fiber, and urethane elastic fiber.

13. The power transmission belt according to claim 2 wherein the cloth covering comprises a fibrous textile that is one of a flat-woven textile, a twill textile, and a satin textile.

14. The power transmission belt according to claim 2 wherein the cloth covering comprises a fibrous textile, comprising at least one of aramid fiber, urethane elastic yarn, and an aliphatic fiber that is at least one of 6-nylon, 66-nylon, polyester, and polyvinyl alcohol.

15. The power transmission belt according to claim 1 wherein the powdery inorganic filler comprises carbon black.

16. The power transmission belt according to claim 1 wherein the body rubber in a vulcanized state has a storage elastic modulus (E') measured at 70° C. according to J1S K6394 that is from 200 to 300 MPa and a loss factor (Tan δ) within a range of 0.1 to 0.2.

17. The power transmission belt according to claim 1 wherein the unsaturated carboxylic acid metal salt is a salt formed by an ionic bond of an unsaturated carboxylic acid comprising at least one carboxyl group and a metal.

18. The power transmission belt according to claim 17 wherein the unsaturated carboxylic acid comprises at least one of: a) monocarboxylic acid; and b) dicarboxylic acid.

19. The power transmission belt according to claim 18 wherein the metal comprises at least one of magnesium, titanium, iron, copper, zinc, aluminum, lead and nickel.

20. The power transmission belt according to claim 1 wherein the hydrogenated nitrile rubber comprises an unsaturated rubber with an iodine value from 7 to 30 mg/100 mg.

21. The power transmission belt according to claim 20 wherein the iodine value is from 11 to 28 mg/100 mg.

22. The power transmission belt according to claim 1 wherein the short fiber is at least one of aramid fiber, PBO (polyparaphenylene benzobisoxazole) fiber, polyvinyl alcohol fiber, and carbon fiber.

23. The power transmission belt according to claim 1 wherein the at least one load carrying member comprises at least one cord formed using twisted fibers.

* * * * *